United States Patent
Michal

(10) Patent No.: US 10,348,185 B1
(45) Date of Patent: Jul. 9, 2019

(54) OUTPUT CURRENT SENSING FOR DC/DC CONVERTER WITH EXTERNAL POWER STAGE

(71) Applicant: Infineon Technologies AG, Neubiberg (DE)

(72) Inventor: Vratislav Michal, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/043,834

(22) Filed: Jul. 24, 2018

(51) Int. Cl.
- H02M 1/15 (2006.01)
- H02M 3/158 (2006.01)
- H02M 3/335 (2006.01)
- H02M 1/00 (2006.01)

(52) U.S. Cl.
CPC ............ H02M 1/15 (2013.01); H02M 3/1584 (2013.01); H02M 3/33507 (2013.01); *H02M 2001/0009* (2013.01)

(58) Field of Classification Search
CPC .......... H02M 1/14; H02M 1/15; H02M 3/158; H02M 3/1584; H02M 3/33507; H02M 2003/158; H02M 2001/0009
See application file for complete search history.

(56) References Cited

U.S. PATENT DOCUMENTS

| 8,350,537 B2* | 1/2013 | Sheen | G05F 1/46 307/103 |
| 8,582,324 B2* | 11/2013 | Lin | H02M 1/14 363/21.12 |
| 2013/0265025 A1* | 10/2013 | Hattori | H02M 3/1588 323/282 |
| 2014/0009989 A1* | 1/2014 | Lin | H02M 3/156 363/132 |

* cited by examiner

*Primary Examiner* — Matthew V Nguyen
(74) *Attorney, Agent, or Firm* — Schiff Hardin LLP

(57) ABSTRACT

A method for sensing an output current of a Direct Current-to-Direct Current (DC/DC) converter having an external power stage configured to supply a converted current to an external inductor. During a calibration phase at a first start-up of the DC/DC converter: the method includes injecting a calibration current through a switching node of the power stage and through the inductor; and determining a calibration gain of the DC/DC converter to compensate for DC Resistance (DCR) variation by comparing a gain-adjusted voltage across the inductor with a reference voltage. During a measurement phase, the method includes reducing ripple voltage of a switching voltage at the switching node to generate a ripple-reduced switching voltage; and sensing the output current based on a DCR-compensated voltage across the inductor, which is a difference between the ripple-reduced switching voltage and an output voltage of the DC/DC converter with compensation for the DCR variation based on the calibration gain.

18 Claims, 4 Drawing Sheets

DC/DC Converter with Current Sensing Circuit

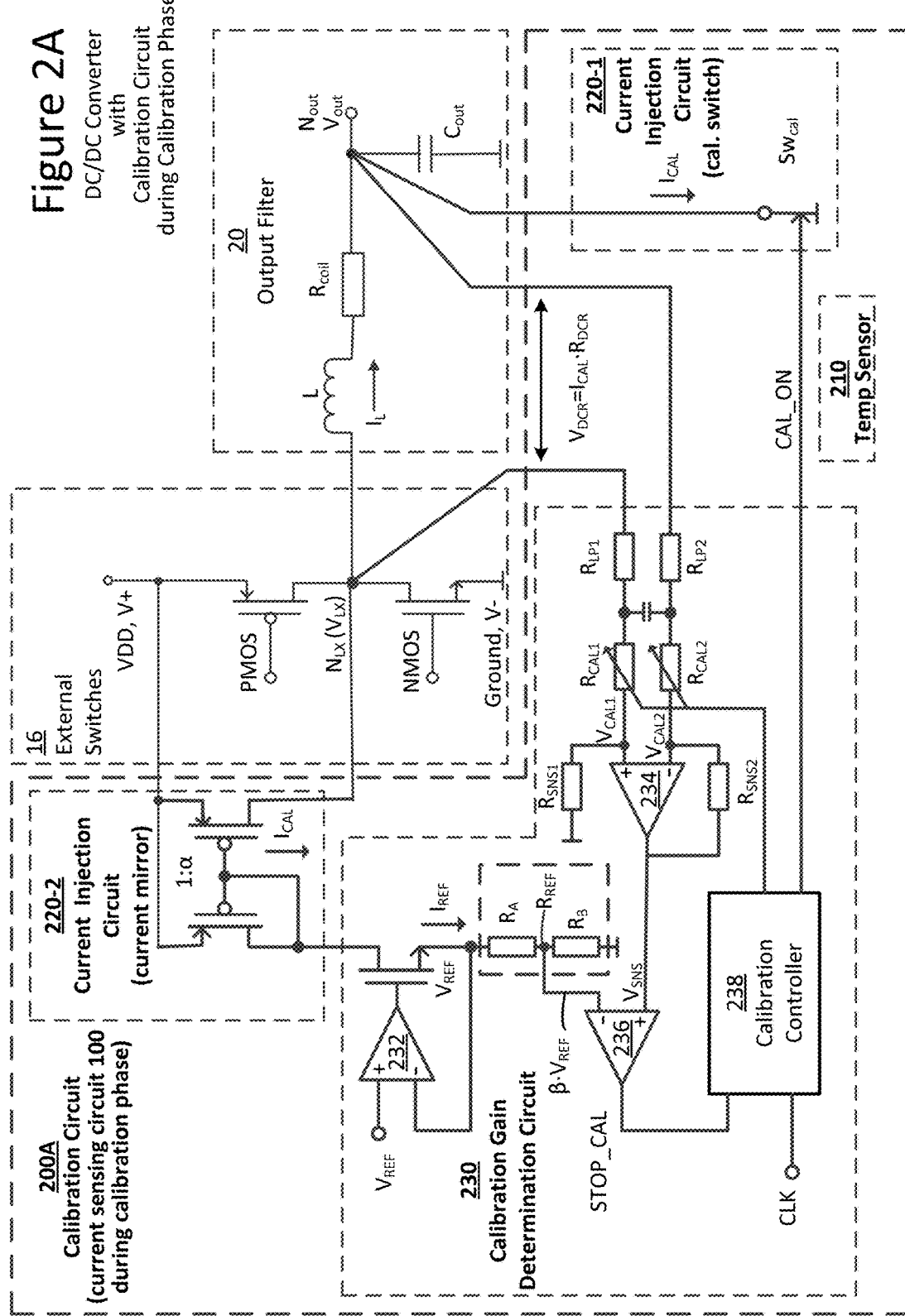

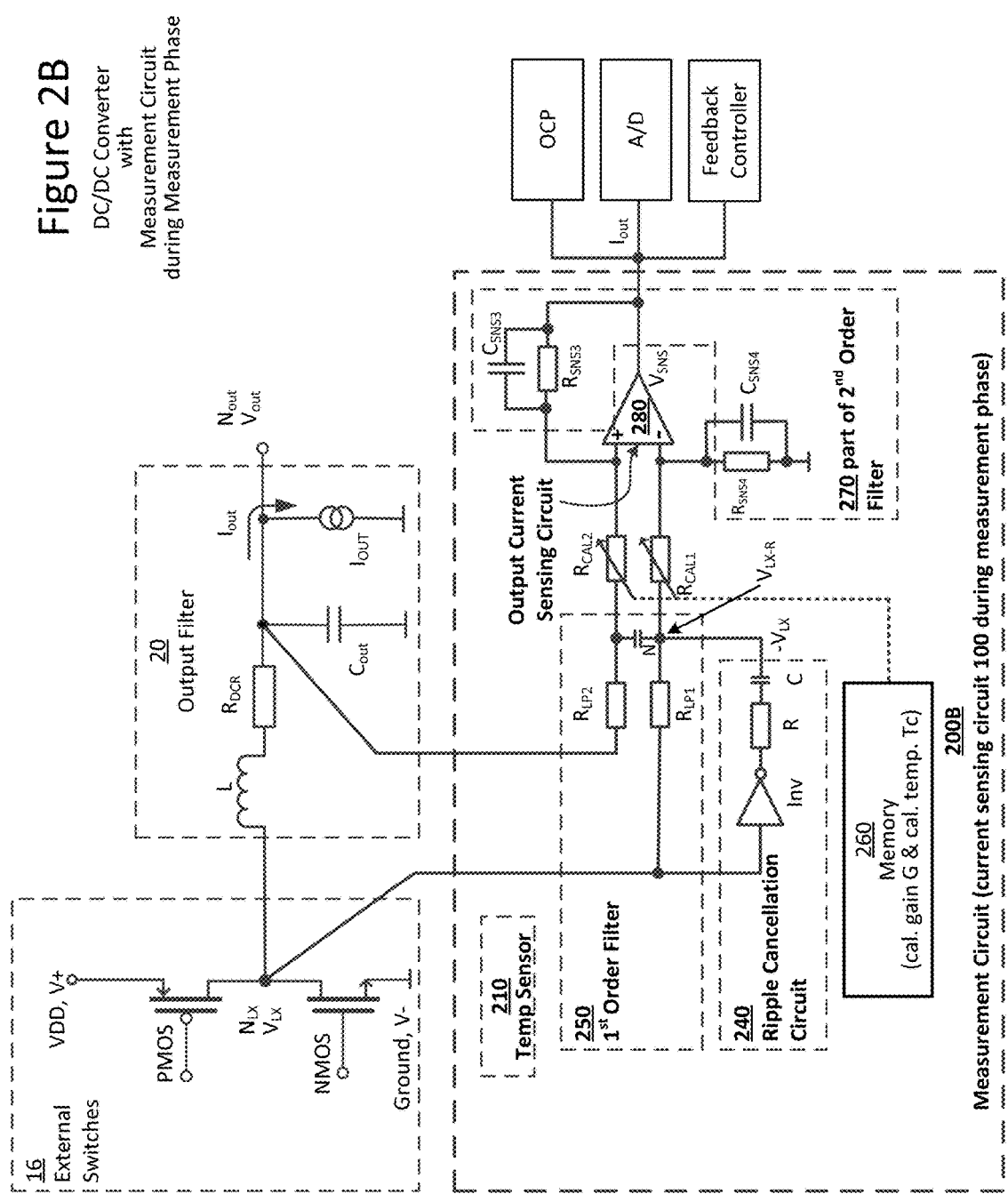

OUTPUT CURRENT SENSING FOR DC/DC CONVERTER WITH EXTERNAL POWER STAGE

BACKGROUND

A Direct Current-to-Direct Current (DC/DC) converter converts a DC voltage from one voltage level to another.

Current sensing in a DC/DC converter with external power switches is used for optimizing power flow in high computation power microcontrollers and current sharing applications. While most power efficiency optimization focuses on circuit optimization, power savings may be realized by a microcontroller implementing more power-efficient software algorithms. Also, the sensed output current may be used by a feedback controller, an Current-Limitation circuit, feed into an Analog-to-Digital converter (A/D), helps to build a power-save mode, and/or in current sharing in interleaving converters.

BRIEF DESCRIPTION OF THE DRAWINGS

FIG. 2A illustrates a schematic diagram of a calibration circuit, which is the current sensing circuit of FIG. 1 during a calibration phase, in accordance with aspects of the disclosure.

FIG. 2B illustrates a schematic diagram of a measurement circuit, which is the current sensing circuit of FIG. 1 during a measurement phase, in accordance with aspects of the disclosure.

DETAILED DESCRIPTION

The present disclosure is directed a Direct Current-to-Direct Current (DC/DC) converter with a current sensing circuit configured to measure the DC/DC converter's output current. The current sensing circuit performs a calibration to reduce variations in inductor DC Resistance (DCR) and in package and Printed Circuit Board (PCB) resistances. The calibration is based on a reference voltage and a reference resistance. Eventually, it can be based also on a reference current which is often unavailable or inaccurate. The current sensing circuit may additionally perform active ripple cancellation to enable faster sensing, and/or thermal monitoring to compensate for thermal variations of the inductor resistance.

Figure 1:
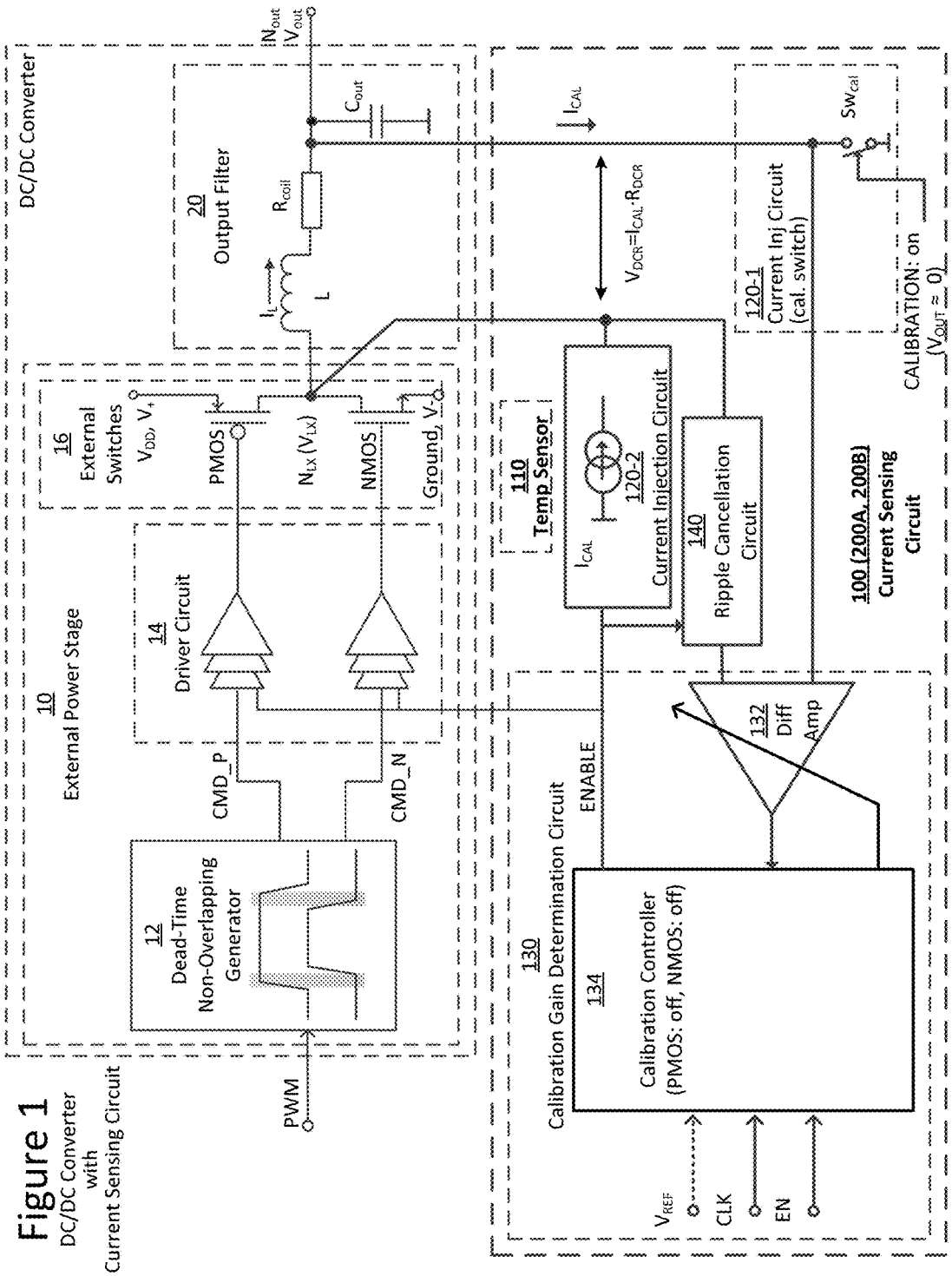
FIG. 1 illustrates a schematic diagram of a DC/DC converter with a current sensing circuit in accordance with aspects of the disclosure.

FIG. 1 illustrates a schematic diagram of a DC/DC converter with a current sensing circuit 100 in accordance with aspects of the disclosure.

The DC/DC converter comprises an external power stage 10 and an output filter 20. The external power stage 10 comprises a dead-time non-overlapping generator 12, driver circuit 14, and external switches 16. The dead-time non-overlapping generator 12 is configured to receive a Pulse Width Modulation (PWM) signal and generate gate driving signals CMD_P, CMD_N with dead time. The amplifying driver circuit 14 is configured to provide strong gate driving signals CMD_P, CMD_N before input to the gates of the external switches PMOS, NMOS. The dead time avoids short-circuit conditions occurring when both of the external switches PMOS, NMOS are on at the same time.

The output filter 20 comprises an external inductor L, a coil parasitic resistor $R_{coil}$, and an output capacitor $C_{out}$. The output filter 20 is configured to provide an average value of the switching voltage $V_{LX}$ at the switching node $N_{LX}$ between the external switches PMOS, NMOS of the power stage 10.

The current-sensing circuit 100 is configured around the inductor L of the DC/DC converter's output filter 20. The current sensing circuit 100 comprises a temperature sensor 110, a current injection circuit 120, a calibration gain determination circuit 130, and a ripple cancellation circuit 140. The calibration gain determination circuit 130 comprises a differential amplifier 132 and a calibration controller 134. The calibration controller 134 is configured to receive a reference voltage $V_{REF}$, a clock signal CLK, and an enable signal EN.

The DC/DC converter has an initial calibration phase, followed by measurement phases. The calibration phase occurs, for example, only during a first turn-on of the DC/DC converter. During the calibration phase, the external switches 16 (PMOS and NMOS) are off, and the current injection circuit 120 (120-1 and 120-2) is configured to inject a calibration current $I_{CAL}$ through the switching node $N_{LX}$ of the power stage 10 and through the inductor L of the output filter 20. The calibration phase begins when the calibration switch 120 clamps the DC/DC converter output voltage $V_{out}$ to ground, and by triggering the switching node $N_{LX}$ to high impedance. During the subsequent measurement phases, the calibration switch 110 is opened, thereby enabling the output of the filter 20.

FIGS. 2A and 2B illustrate the DC/DC converter with details of the current sensing circuit 100 during the calibration and measurement phases. More specifically, FIG. 2A illustrates the current sensing circuit 100 during the calibration phase, and FIG. 2B illustrates the current sensing circuit 100 during the subsequent measurement phases.

FIG. 2A illustrates a schematic diagram of a calibration circuit 200A, which is the current sensing circuit 100 of FIG. 1 during the calibration phase, in accordance with aspects of the disclosure.

The calibration circuit 200A comprises a temperature sensor 210, a current injection circuit 220, and a calibration gain determination circuit 230.

The temperature sensor 210 is configured to measure, during the calibration phase, a calibration temperature T of the inductor L. The temperature sensor 210 may comprise an on-chip temperature sensor of, for example, the microprocessor, or alternatively, an external temperature sensor placed near the inductor L.

The current injection circuit 220 comprises a calibration switch ($SW_{cal}$) 220-1 and a current mirror 220-2. The current injection circuit 220 is configured to inject a calibration current $I_{CAL}$ through the switching node $N_{LX}$ of the power stage 10 and through the inductor L of the output filter 20 to the output node $N_{out}$. The current mirror 220-2 is configured to mirror a reference current $I_{REF}$ to generate the calibration current $I_{CAL}$. The reference current $I_{REF}$ is based on the reference voltage $V_{REF}$ and a reference resistance $R_{REF}$. The reference resistance $R_{REF}$ is formed by a resistive divider comprising resistors $R_A$ and $R_B$, and is equal to $R_B/R_A+R_B$. Eventually, reference current can be supplied from external source, if available.

The calibration gain determination circuit 230 comprises an operational amplifier 232, a differential amplifier 234, a comparator 236, a calibration controller 238, and various resistors. The calibration gain determination circuit 230 is configured to determine a calibration gain G of the current sensing circuit to compensate for DC Resistance (DCR) variation by comparing a gain-adjusted voltage $V_{SNS}$ across the inductor L with a reference voltage $\beta \cdot V_{REF}$. The calibration determination circuit 230 adjusts a gain of the differential amplifier 234 until a calibration condition is reached, and then the calibration gain G is stored, as discussed in more detail below.

The calibration controller 238 is configured to adjust the gain of the differential amplifier 234 by increasing a value of a feedback resistance $R_{SNS}$ and comparing the gain-adjusted voltage $V_{SNS}$ across the inductor L with the reference voltage $\beta \cdot V_{REF}$. More specifically, the calibration controller 238 is configured to increment a first resistance value of a first calibration resistor $R_{CAL1}$ coupled between the switching node $N_{LX}$ and a first input (+) of the differential amplifier 234 to generate a gain-adjusted switching voltage $V_{CAL1}$, and to increment a second resistance value of a second calibration resistor $R_{CAL2}$ coupled between the output node $N_{out}$ and a second input (−) of the differential amplifier 234 to generate a gain-adjusted output voltage $V_{CAL2}$. The differential amplifier 234 is configured to determine a difference between the gain-adjusted switching voltage $V_{CAL1}$ and the gain-adjusted output voltage $V_{CAL2}$, and output the gain-adjusted voltage $V_{SNS}$ across the inductor L.

The comparator 236 is configured to compare the gain-adjusted voltage $V_{SNS}$ across the inductor L with the reference voltage $\beta \cdot V_{REF}$, and to signal the calibration controller 238 to stop incrementing the resistance values of the first and second calibration resistors $R_{CAL1}$, $R_{CAL2}$ when the gain-adjusted voltage $V_{SNS}$ across the inductor L equals the reference voltage $\beta \cdot V_{REF}$, that is, $V_{SNS} = \beta \cdot V_{REF}$. At this time, the calibration gain G is reached, and the current mirror 220-2 is disconnected and the calibration switch 220-1 opened so that the DC/DC converter may operate normally. The feedback resistance $R_{SNS}$ is then a scaled image of the coil resistance $R_{DCR}$.

The calibration controller 238 is further configured to store in a memory 260 (shown in FIG. 2B) the calibration gain G, which is based on the first resistance value of the first calibration resistor $R_{CAL1}$ and/or the second resistance value of the second calibration resistor $R_{CAL2}$ when the gain-adjusted voltage $V_{SNS}$ across the inductor L equals the reference voltage $\beta \cdot V_{REF}$. This memory 260 may be, for example, a One-Time-Programmable (OTP) memory or EEPROM memory.

Further, the temperature sensor 210 is configured to measure, during the calibration phase, a calibration temperature T of the inductor L. The memory 260 (shown in FIG. 2B) is further configured to store the measured calibration temperature T. Alternatively, the calibration may be performed at known temperature, for example, during a first startup of the DC/DC converter.

The calibration gain G and a calibration temperature T are stored in a memory 260 during the calibration phase at a first startup of the DC/DC converter. This calibration gain G and temperature T are recalled from the memory 260 during subsequent measurement phases. The calibration relies on the value of the reference resistor $R_{REF}$. A reference current, which is often unavailable or inaccurate, is not required for the calibration. In some cases, when a supply voltage $V_{DD}$ is accurate enough, the reference voltage $V_{REF}$ is not required because the reference voltage $V_{REF}$ can be derived from the supply voltage $V_{DD}$.

To assist in a more detailed understanding of the operation of the calibration phase, the following few paragraphs include equations representing how the calibration gain G is determined.

The parasitic inductor resistance $R_{DCR}$ is derived from the reference voltage $V_{REF}$ and the resistors $R_A$ and $R_B$ as follows:

$$V_{DCR} = \alpha \frac{V_{REF}}{R_A + R_B} \cdot R_{DCR} \quad \text{(Equation 1)}$$

whereas the calibration current $I_{CAL}$ is an $\alpha$-scaled image of the reference current $I_{REF}$. The reference voltage $V_{REF}$ is provided by the differential amplifier 232. The differential amplifier gain $R_{SNS}/(R_{LP}+R_{CAL})$ provides the output voltage $V_{SNS}$ on the output of the differential amplifier 234 as follows:

$$V_{SNS} = \frac{R_{SNS}}{R_{CAL} + R_{LP}} \cdot V_{DCR} \quad \text{(Equation 2)}$$

The value of the calibration resistance $R_{CAL}$ is incremented in order to adjust the gain of the differential amplifier 234. The calibration condition is defined as:

$$V_{SNS} = \beta \cdot V_{REF}, \quad \text{(Equation 3)}$$

where $\beta = R_B/(R_A+R_B)$ is attenuation of resistive divider considered constant. As the outcome of the calibration, the feedback resistance $R_\lambda = R_{CAL} + R_{LP}$ is the scaled image of $R_{DCR}$:

$$R_\lambda = \alpha \cdot \frac{R_{SNS}}{R_B} \cdot R_{DCR}. \quad \text{(Equation 4)}$$

In other words, the calibration current $I_{CAL}$ is derived based on trimmed on-chip resistances $R_A$ and $R_B$, whereas $R_{SNS}$ and $R_\lambda$ are process dependent on-chip resistances. The process dependency is then removed during current measurement, as the gain of the differential amplifier 234 depends on an accurate ratio $R_{SNS}/R_\lambda$.

Since the calibration is performed only once during the lifetime of the DC/DC converter, the power components, such as the calibration switch 220-1 and the current mirror 220-2, can be sized reasonably small and do not need to sustain reliability. The requirement on the calibration switch resistance is also relaxed, as it is preferred to provide clamping around several hundred mV referred to ground.

During the calibration phase, the low offset of the differential amplifier 234 (<1 mV) is required. Additionally, a temperature T of the DC/DC converter is stored for subsequent temperature correction, as described further below. In order to reduce the voltage drop on the on-chip parasitic layout resistance, double bonding may be used, with separated current and voltage paths for the switching node $N_{LX}$.

FIG. 2B illustrates a schematic diagram of a measurement circuit 200B, which is the current sensing circuit 100 of FIG. 1 during a measurement phase, in accordance with aspects of the disclosure.

The measurement circuit 200B comprises a ripple cancellation circuit 240, a passive first-order low-pass filter 250, a memory 260, an active second-order low-pass filter 270, an output current sensing amplifier 280, and temperature compensation controller. The temperature compensation controller may be part of a same controller as the calibration controller 238 or a separate controller.

During the measurement phase, the calibration switch 110 is open, thereby enabling the output filter 20.

The ripple cancellation circuit 240 is configured to reduce ripple voltage of the switching voltage $V_{LX}$ at the switching node $N_{LX}$ to generate a ripple-reduced switching voltage $V_{LX-R}$. During the measurement phase, the switching node voltage $V_{LX}$ feeds high ripple voltage to the sensitive input of the differential amplifier, which is an output current sensing circuit 280. While the output of the DC/DC converter is supposed to provide an output voltage $V_{OUT}$ having low ripple, the switching node $N_{LX}$ operates in the ground-to-VDD range. Accordingly the ripple current $I_{AC}$ inside a passive filter in the differential amplifier 280 is mainly due to the current in the filtering capacitor and $R_{LP}$ ($R_{LP} \gg R_{CAL}$) and is approximately:

$$I_{AC} \approx \frac{V_{DD}}{Z(C(\omega) + 2 \cdot R_{LP})} \quad \text{(Equation 5)}$$

In other words, the differential amplifier 280 receives in one terminal a stable "DC" voltage $V_{OUT}$, while in the other terminal a square voltage $V_{LX}$ with high amplitude. Filtering this high voltage provides a long time constant of, for example, several tens of switching cycles.

The ripple cancellation circuit 240 comprises an inverter Inv, a resistor R and a capacitor C. The ripple cancellation circuit 240 is configured to provide an opposing-phase switching voltage having a 180° phase difference from that of the switching voltage $V_{LX}$. This is realized by the inverter Inv and matched resistor-capacitor (R-C) coupled in series creating a ripple current having a 180° phase difference from that of the switching voltage $V_{LX}$. The opposing-phase switching voltage is combined at node N with the switching voltage $V_{LX}$, thereby eliminating the AC components of the switching voltage $V_{LX}$ to result in a rippled-reduced switching voltage $V_{LX-R}$. Also as a result, the number of switching cycles during which the sensed current is determined is reduced.

The passive first-order low-pass filter 250 comprises low pass filter resistors $R_{LP1}$ and $R_{LP2}$. Resistor $R_{LP1}$ is coupled between the switching node $N_{LX}$ and the first calibration resistor $R_{CAL1}$. Resistor $R_{LP2}$ is coupled between the output node $N_{out}$ and the second calibration resistor $R_{CAL2}$. The passive first-order low-pass filter 250 is configured to first-order low-pass filter the switching voltage $V_{LX}$ and the output voltage $V_{OUT}$ of the DC/DC converter.

The active low-pass filter 270 comprises an RC circuit comprising resistor $R_{SNS3}$ and capacitor $C_{SNS3}$ coupled in parallel between a positive input and an output of the differential amplifier 280. The filter 270 also comprises an RC circuit having resistor $R_{SNS4}$ and capacitor $C_{SNS4}$ coupled in parallel and between the negative input of the differential amplifier 280 and ground. The active second-order low-pass filter 270 and 250 is configured to second-order low-pass filter the DCR-compensated voltage $V_{SNS}$ across the inductor L.

The calibration gain G stored in the memory 260, during the calibration phase as discussed above, is used to adjust the calibration resistors $R_{CAL1}$ and $R_{CAL2}$ to calibrate the DC/DC converter during the subsequent measurement phases.

The output current sensing circuit 280, that is, the differential amplifier, is configured to receive at the positive input the output voltage $V_{OUT}$ of the DC/DC converter with compensation for DCR variation based on the calibration gain G, to receive at the negative input the ripple-reduced switching voltage $V_{LX-R}$ with compensation for DCR variation based on the calibration gain G, and to output the DCR-compensated voltage $V_{SNS}$ across the inductor L. The output current sensing circuit 280 senses the output current $I_{out}$ based on a DCR-compensated voltage $V_{SNS}$ across the inductor L, which is a difference between the ripple-reduced switching voltage $V_{LX-R}$ and an output voltage $V_{out}$ of the DC/DC converter with compensation for the DCR variation based on the calibration gain G.

The sensed output current $I_{out}$ may then be transmitted to a microprocessor, a feedback controller, an Over-Current Protection (OCP) or current limitation circuit, an Analog-to-Digital converter (A/D), or other device.

During the measurement phase, the current through the inductor L is much higher than during the calibration phase. This results in relaxed requirements on the offset of the differential amplifier 280.

The parasitic drop on $R_{DCR}$ together with the amplification chain provides the output voltage of:

$$V_{SNS} = I_{COIL} R_{DCR} \cdot \frac{R_{SNS}}{R_\lambda}. \quad \text{(Equation 6)}$$

However, as $R_\lambda$ has the same process variation as $R_{SNS}$, the process dependences of the resistor absolute value are eliminated.

The temperature compensation controller, which may be part of a same controller as the calibration controller 238 or a separate controller, is configured to correct the DCR-compensated voltage $V_{SNS}$ across the inductor L based on a measurement-phase temperature Ts (sensing temperature) and the calibration-phase temperature Tc of the inductor L.

The thermal coefficient $R_{\theta^\circ}$ of copper is about 0.3%/° C., and should be taken into account in a final current sensing or measurement result. Additionally, the copper thermal coefficient $R_{\theta^\circ}$ has decent linearity. The sensing of the temperature can be performed during a condition of good thermal equilibrium, for example, less than 15° of difference between thermal sensor and actual inductor temperature, by an on-chip temperature sensor 210, where the temperature of the inductor L is substituted with the temperature of the chip. Alternatively, the sensing of the temperature can be performed by an external temperature sensor placed near the inductor L; this alternative option is more accurate, but requires an additional component and extra pin.

The final image of the sensed current $V_{SNS}'$ is then obtained by a linear correction of the sensed voltage $V_{SNS}$ at the sensed temperature $T_s$, accounting for the temperature of the calibration $T_{CAL}$ as follows:

$$V_{SNS}' = V_{SNS}(1 + \alpha(T_s - T_{CAL})) \quad \text{(Equation 7)}$$

To assist in a more detailed understanding of the operation of the measurement phase, the following few paragraphs include equations representing how the measurements are determined.

While analyzing the current-to-voltage transfer function, the focus is on $$L\frac{di}{dt}$$

compound of the output filter impedance. As result, the V/I transfer function of the inductor L can be written as impedance as follows:

$$\frac{V_{coil}(s)}{I_{coil}(s)} = R_L + sL.$$ (Equation 8)

This signifies that the voltage across the inductor L during a transient event is highly influenced by the sL component. The desired output voltage of the current sensor may be written as follows:

$$V_{SNS} = k \cdot I_{coil} = F_{SNS}(s) \cdot (R_L + sL) \cdot I_{coil}$$ (Equation 9)

where k is the constant related to the sensing gain. Then desired transfer function $F_{SNS}(s)$ should then compensate the term sL:

$$F_{SNS}(s) = \frac{k}{R_L + sL} = \frac{k/R_L}{1 + sL/R_L}$$ (Equation 10)

The small-signal transfer function of the sensing circuit can be assumed as $3^{rd}$-order transfer function of the form:

$$F_{SNS} = \frac{G_0}{(s + \omega_{p1})(s + \omega_{p2})\left(s + \frac{1}{R_{SNS}C}\right)}$$ (Equation 11)

It can be shown, that the dominant transfer pole $$\frac{1}{R_{SNS}C}$$

can sufficiently compensate the zero coming from the inductor impedance term sL. This term can be therefore used to compensate the term sL mentioned previously. In order to obtain this compensation, the following equation is to be fulfilled:

$$\frac{R_L}{L} = \frac{1}{R_{SNS}C},$$ (Equation 12)

leading to a condition:

$$C = \frac{L}{R_{coil} \cdot R_{SNS}}.$$ (Equation 13)

Figure 3:
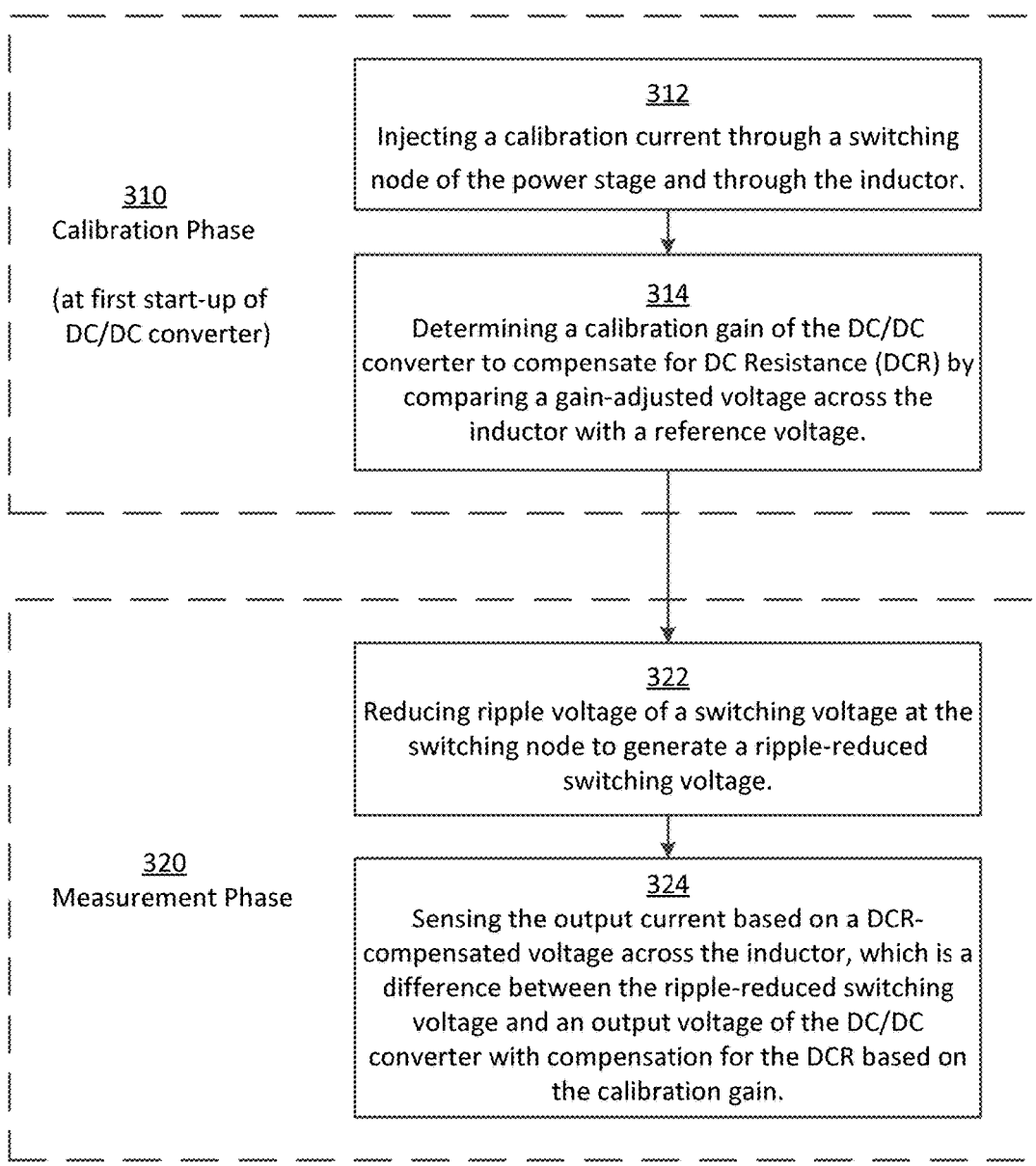
FIG. 3 illustrates a flowchart of a method of operating the current sending circuit of FIGS. 1, 2A, and 2B in accordance with aspects of the disclosure.

FIG. 3 illustrates a flowchart of a method 300 of operating the current sensing circuit 100 (200A, 200B) of FIGS. 1, 2A, and 2B, in accordance with aspects of the disclosure.

During a calibration phase 310 at a first start-up of the DC/DC converter, a calibration current $I_{CAL}$ is injected through a switching node $N_{LX}$ of the power stage 10 and through the inductor L (Step 312). A calibration gain G of the DC/DC converter is then determined to compensate for DC Resistance (DCR) variation by comparing a gain-adjusted voltage $V_{SNS}$ across the inductor L with a reference voltage $\beta \cdot V_{REF}$ (Step 314).

During a measurement phase, a ripple voltage of a switching voltage $V_{LX}$ is reduced at the switching node $N_{LX}$ to generate a ripple-reduced switching voltage $V_{LX-R}$ (Step 322). The output current $I_{OUT}$ is then sensed based on a DCR-compensated voltage $V_{SNS}$ across the inductor L, which is a difference between the ripple-reduced switching voltage $V_{LX-R}$ and an output voltage $V_{OUT}$ of the DC/DC converter with compensation for the DCR variation based on the calibration gain G (Step 324).

The DC/DC converter as described herein has many advantages over prior devices. The aspects of this disclosure are based on a calibration by a current generated by trimmed integrated resistance. The reference current has then an accurate value. There is no need for an accurate external current source for the calibration process. The current sensing required is fast in that it requires few switching cycles.

The value of the output current of the DC/DC converter is important for power efficiency optimization, the feedback controller, over-current protection, built-in power-save mode, improved current sharing of an interleaved DC/DC converter, etc.

Current sharing/balancing in multiphase DC/DC converters is one application of the disclosed current sensor. Temperature sensing of the coil to remove copper temperature dependence is not needed, nor are trimmed reference resistors. Of course the disclosure is not limited to copper, but is applicable to other materials used to form circuit components.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A method for sensing an output current of a Direct Current-to-Direct Current (DC/DC) converter having an external power stage configured to supply a converted current to an external inductor, the method comprising:
during a calibration phase at a first start-up of the DC/DC converter:
injecting a calibration current through a switching node of the power stage and through the inductor; and
determining a calibration gain of the DC/DC converter to compensate for DC Resistance (DCR) variation by comparing a gain-adjusted voltage across the inductor with a reference voltage;
during a measurement phase:
reducing ripple voltage of a switching voltage at the switching node to generate a ripple-reduced switching voltage; and
sensing the output current based on a DCR-compensated voltage across the inductor, which is a difference between the ripple-reduced switching voltage and an output voltage of the DC/DC converter with compensation for the DCR variation based on the calibration gain.

2. The method of claim 1, further comprising:
measuring a calibration-phase temperature of the inductor during the calibration phase; and
storing the measured calibration-phase temperature in the memory.

3. The method of claim 2, further comprising:
correcting the DCR-compensated voltage across the inductor based on a measurement-phase temperature and the calibration-phase temperature.

4. The method of claim 1, wherein the reducing the ripple voltage from the switching voltage at the switching node comprises:
providing an opposing-phase switching voltage having a 180° phase difference from that of the switching voltage; and
combining the opposing-phase switching voltage with the switching voltage to generate a ripple-reduced switching voltage.

5. The method of claim 1, further comprising:
first-order low-pass filtering the switching voltage and the output voltage of the DC/DC converter.

6. The method of claim 1, further comprising:
second-order low-pass filtering the DCR-compensated voltage across the inductor.

7. The method of claim 1, further comprising:
outputting the sensed output current to a microprocessor.

8. A method for sensing an output current of a Direct Current-to-Direct Current (DC/DC) converter having an external power stage configured to supply a converted current to an external inductor, the method comprising:
reducing ripple voltage of a switching voltage at a switching node of the power stage to generate a ripple-reduced switching voltage; and
sensing the output current based on a difference between the ripple-reduced switching voltage and an output voltage of the DC/DC converter across the inductor compensated for DC Resistance (DCR) based on a calibration gain.

9. The method of claim 8, further comprising:
correcting the DCR-compensated voltage across the inductor based on a temperature of the inductor and a calibration temperature measured during a determination of the calibration gain.

10. A Direct Current to Direct Current (DC/DC) converter having an external power stage configured to supply a converted current to an external inductor, comprising:
a calibration circuit comprising:
a current injection circuit configured to inject a calibration current through a switching node of the power stage and through the inductor; and
a calibration gain determination circuit configured to determine a calibration gain of the DC/DC converter to compensate for DC Resistance (DCR) variation by comparing a gain-adjusted voltage across the inductor with a reference voltage;
a measurement circuit comprising:
a ripple cancellation circuit configured to reduce ripple voltage of a switching voltage at the switching node to generate a ripple-reduced switching voltage; and
an output current sensing circuit configured to sense the output current based on a DCR-compensated voltage across the inductor, which is a difference between the ripple-reduced switching voltage and an output voltage of the DC/DC converter with compensation for the DCR variation based on the calibration gain.

11. The DC/DC converter of claim 10, wherein the current injection circuit comprises:
a calibration switch configured to clamp the output voltage to ground during calibration gain determination; and
a current mirror configured to mirror a reference current, which is based on the reference voltage and a reference resistor.

12. The DC/DC converter of claim 10, wherein the calibration gain determination circuit comprises:
a differential amplifier;
a calibration controller configured to increment a first resistance value of first calibration resistor coupled between the switching node and a first input of the differential amplifier to generate a gain-adjusted switching voltage, and to increment a second resistance value of a second calibration resistor coupled between the output node and a second input of the differential amplifier to generate a gain-adjusted output voltage,
wherein the differential amplifier is configured to determine a difference between the gain-adjusted switching voltage and the gain-adjusted output voltage, and output the gain-adjusted voltage across the inductor; and
a comparator configured to compare the gain-adjusted voltage across the inductor with the reference voltage, and to signal the calibration controller to stop the incrementing the first and second resistance values when the gain-adjusted voltage across the inductor equals the reference voltage,
wherein the calibration controller is further configured to store in a memory the calibration gain, which is based on the first or second resistance value when the gain-adjusted voltage across the inductor equals the reference voltage.

13. The DC/DC converter of claim 10, wherein the output current sensing circuit comprises:
a differential amplifier configured to receive at a first input the output voltage of the DC/DC converter with compensation for DCR variation based on the calibration gain, to receive at a second input the ripple-reduced switching voltage with compensation for DCR variation based on the calibration gain, and to output the DCR-compensated voltage across the inductor.

14. The DC/DC converter of claim 10, further comprising:
a temperature sensor configured to measure a calibration temperature of the inductor during calibration gain determination,
wherein the memory is further configured to store the measured calibration temperature in the memory.

15. The DC/DC converter of claim 14, further comprising:
a temperature compensation controller configured to correct the DCR-compensated voltage across the inductor based on a sensing temperature of the inductor during output current sensing and the calibration temperature.

16. The DC/DC converter of claim 10, wherein the ripple cancellation circuit comprises:
an inverter circuit configured to invert the switching voltage to provide an opposing-phase switching voltage having a phase opposite that of the switching voltage; and
a node configured to combine the opposing-phase switching voltage with the switching voltage to generate a ripple-reduced switching voltage.

17. The DC/DC converter of claim 10, further comprising:

a passive first-order low-pass filter configured to first-order low-pass filter the switching voltage and the output voltage of the DC/DC converter.

18. The DC/DC converter of claim 10, further comprising:
an active second-order low-pass filter configured to second-order low-pass filter the DCR-compensated voltage across the inductor.

* * * * *